United States Patent
Idogawa et al.

(10) Patent No.: US 7,591,243 B2
(45) Date of Patent: Sep. 22, 2009

(54) FUEL INJECTION CONTROL APPARATUS AND METHOD FOR DIRECT INJECTION INTERNAL COMBUSTION ENGINE

(75) Inventors: Masanao Idogawa, Toyota (JP); Osamu Hosokawa, Toyota (JP); Jun Maemura, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 11/792,411

(22) PCT Filed: Dec. 23, 2005

(86) PCT No.: PCT/IB2005/003885

§ 371 (c)(1),
(2), (4) Date: Jun. 6, 2007

(87) PCT Pub. No.: WO2006/070259

PCT Pub. Date: Jul. 6, 2006

(65) Prior Publication Data

US 2008/0087251 A1  Apr. 17, 2008

(30) Foreign Application Priority Data

Dec. 27, 2004  (JP) .................... 2004-377306

(51) Int. Cl.
*F02B 3/00* (2006.01)
(52) U.S. Cl. .................... 123/299; 123/179.16
(58) Field of Classification Search ........ 123/299, 123/300, 179.16, 179.17
See application file for complete search history.

(56) References Cited

U.S. PATENT DOCUMENTS

| | | | | |
|---|---|---|---|---|
| 6,055,956 A | * | 5/2000 | Nishimura et al. | 123/299 |
| 6,116,208 A | * | 9/2000 | Nishimura et al. | 123/295 |
| 6,240,724 B1 | * | 6/2001 | Kudou et al. | 60/284 |
| 6,244,241 B1 | * | 6/2001 | Mamiya et al. | 123/295 |
| 6,257,197 B1 | * | 7/2001 | Nishimura et al. | 123/295 |
| 6,907,862 B2 | * | 6/2005 | Kitahara | 123/434 |
| 7,334,398 B2 | * | 2/2008 | Kitahara | 60/285 |
| 2005/0011484 A1 | | 1/2005 | Wagner et al. | |
| 2005/0039440 A1 | * | 2/2005 | Kitahara | 60/274 |
| 2006/0075741 A1 | * | 4/2006 | Shiraishi et al. | 60/285 |
| 2006/0266326 A1 | * | 11/2006 | Yasunaga et al. | 123/299 |

FOREIGN PATENT DOCUMENTS

| | | |
|---|---|---|
| DE | 102 05 494 A1 | 8/2003 |
| EP | 0 919 711 A2 | 6/1999 |
| EP | 1 035 315 A2 | 9/2000 |
| EP | 1 077 321 A2 | 2/2001 |
| JP | 11-218049 A | 8/1999 |
| JP | 2000-54882 A | 2/2000 |
| JP | A 2000-205021 | 7/2000 |
| JP | A 2001-193463 | 7/2001 |
| JP | A 2003-65121 | 3/2003 |
| JP | 2004-36581 A | 2/2004 |
| JP | A 2004-225658 | 8/2004 |

* cited by examiner

*Primary Examiner*—Thomas N Moulis
(74) *Attorney, Agent, or Firm*—Oliff & Berridge, PLC

(57) ABSTRACT

In a direct injection internal combustion engine which switches a fuel injection mode between a batch injection in which fuel is injected once and a split injection in which fuel is injected at a plurality of timings, a fuel increase amount is set larger for the split injection than for the batch injection when increase-correcting a fuel injection quantity set based on an engine operating state.

18 Claims, 8 Drawing Sheets

NOTE: Kb (MAP D) < Kb (MAP E)

FUEL INJECTION CONTROL APPARATUS AND METHOD FOR DIRECT INJECTION INTERNAL COMBUSTION ENGINE

BACKGROUND OF THE INVENTION

1. Field of the Invention

This invention relates to fuel injection control apparatus and method for a direct injection internal combustion engine in which fuel is injected from a fuel injection valve directly into an engine combustion chamber.

2. Description of the Related Art

Normally with fuel injection control in a direct injection internal combustion engine, operation of the fuel injection valves is controlled in response to a target injection quantity that is calculated based on the operating state of the engine, such as engine speed and engine load. The fuel injection quantity is then adjusted to an amount that is suitable for the engine operating state at that time.

An apparatus for performing this kind of fuel injection control, which increase-corrects the fuel injection quantity at start-up when the engine is cold is widely known (see JP(A) 2004-225658, for example). This increase correction is performed to both improve the combustion state and facilitate early warming-up of an exhaust gas control catalyst provided in the engine exhaust passage.

Furthermore, a fuel injection control apparatus is also known which switches the fuel injection mode between a batch injection in which the fuel is injected all at once, and a split injection in which the fuel is injected in a plurality of separate injections (see JP(A) 2003-65121, for example). Switching the fuel injection mode in this way enables the fuel injection state to be finely controlled in a manner appropriate for the engine operating state and the engine temperature and the like.

In a fuel injection control apparatus that performs an increase correction, such as that described above, however, the following problems occur when performing fuel injection control while switching between a batch injection and a split injection.

That is, the amount of fuel that actually contributes to combustion may be less than the amount of fuel injected from the fuel injection valve due to some of the injected fuel adhering to the inside wall of the engine combustion chamber when the engine is cold. As a result, the amount of fuel that actually contributes to combustion changes, which affects the combustion state. Also, the amount of fuel that adheres to the inside wall of the engine combustion chamber changes depending on the fuel injection timing. This is because the area of the inside wall that is exposed in the combustion chamber changes as the engine piston (hereinafter simply referred to as "piston") moves, and the position of the piston changes depending on the fuel injection timing. Moreover, in addition to the fuel injection timing, the period of time between when fuel is injected and when it is ignited, i.e., the time required for the fuel to vaporize, differs which also affects the amount of fuel that adheres.

Also, the direction of movement and the speed of the piston, or the actual volume of the combustion chamber, differs depending on the fuel injection timing, which affects the extent to which injected fuel is vaporized. As the extent to which injected fuel is vaporized changes, the amount of fuel that actually contributes to combustion also changes, which in turn changes the combustion state.

Therefore, even if the amount of fuel is increased in the same way when a batch injection is performed as it is when a split injection is performed, the amount of fuel contributing to combustion is different. Thus there still remains room for improvement in this area.

SUMMARY OF THE INVENTION

In view of the foregoing circumstances, this invention aims to provide a fuel injection control apparatus for a direction injection internal combustion engine, which can, in an internal combustion engine in which the fuel injection mode switches between batch injection and split injection, appropriately increase the amount of fuel injected according to the extent to which fuel vaporizes and the extent to which fuel adheres to the combustion chamber wall in each injection mode.

Hereinafter, the means for achieving the foregoing aim and the operational effects thereof will be described.

A first aspect of the invention relates to a fuel injection control apparatus for a direct injection internal combustion engine, which, when the engine is cold, switches a fuel injection mode between a batch injection in which fuel is injected once at the end of a compression stroke and a split injection in which fuel is injected at a plurality of timings including at least at the end of the compression stroke, and which is provided with increase correcting means for setting a fuel increase amount larger for the split injection than for the batch injection when increase-correcting a fuel injection quantity set based on an engine operating state.

When the engine is cold, fuel that is injected is not sufficiently vaporized. As a result, some of that fuel tends to adhere to the inside wall of the combustion chamber. Also, when the piston is on the top-dead-center (TDC) side, as it is at the end of the compression stroke, the exposed area of wall inside the engine combustion chamber (hereinafter simply referred to as "combustion chamber") is small so fuel adherence is inhibited somewhat. Even so, when fuel is injected at a time other than at the end of the compression stroke, such as at the beginning of the compression stroke, the amount of fuel that adheres increases, reducing the percentage of injected fuel that actually contributes to engine combustion.

In view of this, with the structure according to the first aspect of the invention, when the fuel injection quantity that is set based on the operating state of the engine is increase-corrected, the fuel increase amount is set to be larger for a split injection than it is for a batch injection. Therefore, during a split injection, even if the amount of fuel that adheres to the inside wall of the engine combustion chamber increases, a substantive insufficiency in the fuel injection quantity due to that increase, and thus deterioration of the combustion state due to that insufficiency, is able to be inhibited.

According to a second aspect of the invention, in the fuel injection control apparatus for a direct injection internal combustion engine according to the first aspect of the invention, the increase correcting means sets the fuel increase amount based on at least one of an engine temperature and a time elapsed after engine start-up.

The amount of fuel that adheres to the inside wall of the engine combustion chamber tends to increase the lower the engine temperature, and the temperature of the engine combustion chamber is lower the less time that has elapsed after engine start-up. Accordingly, the amount of fuel that adheres to the inside wall of the engine combustion chamber (hereinafter also referred to as "fuel adhering amount") tends to increase the shorter that elapsed time.

With respect to this, with the structure according to the second aspect of the invention, when the fuel injection quantity is increase-corrected so that the fuel increase amount is larger for a split injection than it is for a batch injection, that fuel increase amount can be set in view of the fuel adhering amount which changes in response to the engine temperature or the time that has elapsed after engine start-up. Accordingly, it is possible to ensure the amount of fuel that actually contributes to combustion and thus further stabilize the combustion state. The engine temperature can be estimated based on, for example, the engine coolant temperature or the engine lubricating oil temperature.

According to the third aspect of the invention, the fuel injection control apparatus for a direct injection internal combustion engine according to first or second aspect of the invention further includes split rate setting means for setting an injection quantity split rate of each injection when the fuel injection mode is set to the split injection. Further, the split rate setting means sets the injection quantity split rate of each injection such that the difference between the injection quantity split rates becomes less the smaller the total quantity of fuel injected by all of the injections of the split injection.

Typically, when the target fuel injection quantity is small, i.e., when the total quantity of fuel to be injected by all of the injections in a split injection is small, the operational response of the fuel injection valve must be extremely fast because the interval between the time that the fuel injection valve is open and the time that it is closed is short. As a result, if the fuel injection quantity of any of the injections is set too small, it is possible that the fuel injection may not be able to be performed properly due to a limit in the operational response of the fuel injection valve.

Regarding this, with the structure according to the third aspect of the invention, when the total quantity of fuel injected by the injections of the split injection is small, i.e., when the fuel injection quantity of any of the injections is extremely small depending on the setting of the injection quantity split rates, the injection quantity split rates of the injections are set so that the difference between them is small. Accordingly, it is possible to inhibit, to the greatest extent possible, the fuel injection quantity of each injection in a split injection from becoming too small, thus making it possible to ensure proper fuel injection operation in each injection. The fuel injection quantity can be calculated based, for example, on the engine speed, the intake air amount, or furthermore, the time elapsed after engine start or the engine temperature that is estimated from the engine coolant temperature or the like.

According to a fourth aspect of the invention, in the fuel injection control apparatus for a direct injection internal combustion engine according to the third aspect of the invention, the split rate setting means sets the injection quantity split rate of each injection so that the injection quantity split rates become equal when the total quantity of fuel injected by all of the injections of the split injection is equal to, or less than, a predetermined quantity.

With this structure, when the total quantity of fuel to be injected by all of the injections of a split injection is equal to, or less than, a predetermined value, i.e., when the total fuel injection quantity is split unevenly and the fuel injection quantity of an injection may fall below the minimum fuel injection quantity of the fuel injection valve, the injection quantity split rates of the injections are set to be equal. It is therefore possible to avoid, to the greatest extent possible, a situation occurring in which normal injection is no longer possible due to a fuel injection quantity of one of the injections of a split injection falling below the minimum fuel injection quantity of the fuel injection valve. As a result, split injections can be executed more often.

According to a fifth aspect of the invention, in the fuel injection control apparatus for a direct injection internal combustion engine according to the third or fourth aspect of the invention, the split rate setting means sets the injection quantity split rate of each injection such that the fuel injection quantity of the injection at the end of the compression stroke is larger than the fuel injection quantity of any other injection when the total quantity of fuel injected by all of the injections of the split injection is greater than a predetermined value.

As described above, if the total quantity of fuel injected by all of the injections of a split injection is small, the operational response of the fuel injection valve becomes an issue. On the other hand, however, when the total quantity of fuel injected is large, there is a high degree of freedom when setting the injection quantity split rates of the injections in a split injection. Therefore, with the structure according to the fifth aspect of the invention, when the total quantity of fuel to be injected is large, the injection quantity split rates are set such that the fuel injection quantity of the injection at the end of the compression stroke is larger than the fuel injection quantity of any other injection. As a result, so-called stratified-charge combustion can be performed stably.

According to a sixth aspect of the invention, in the fuel injection control apparatus for a direct injection internal combustion engine according to any one of the first to the fifth aspects of the invention, the increase correction of the fuel injection quantity is performed when the engine is idling until a predetermined period of time has elapsed after engine start-up.

Here, an apparatus is known which increase-corrects the fuel injection quantity while injecting fuel at the end of the compression stroke in order to raise the exhaust gas temperature when the engine is idling until a predetermined period of time has elapsed after engine start-up. With the structure according to the sixth aspect of the invention, when the fuel injection mode is switched between batch injection and split injection in such an apparatus, a fuel increase can be performed of an amount that is appropriate in view of the extent to which fuel adheres to the inside wall of the combustion chamber in each injection mode.

A seventh aspect of the invention relates to a fuel injection control apparatus for a direct injection internal combustion engine, which, when the engine is cold, switches a fuel injection mode between a batch injection in which fuel is injected once during an intake stroke and a split injection in which fuel is injected a plurality of times during the intake stroke, and which is provided with increase correcting means for setting a fuel increase amount larger for the batch injection than for the split injection when increase-correcting a fuel injection quantity set based on an engine operating state.

As described above, when the engine is cold fuel that is injected does not sufficiently vaporize. As a result, some of fuel tends to adhere to the inside wall of the combustion chamber. When fuel is injected during the intake stroke, however, even if fuel were to adhere, it is highly likely that that adhered fuel would vaporize within the period of time between fuel injection and ignition. In fact, during the intake stroke fuel tends to vaporize better when it is split up and injected over a series of separate injections than when it is injected all at once. Therefore the amount of fuel that does not contribute to engine combustion is greater in a batch injection than it is in a split injection.

In view of this, with the structure according to the seventh aspect of the invention, when increase-correcting the fuel injection quantity that is set based on the operating state of the engine, the fuel increase amount is set larger for a batch injection than it is for a split injection. As a result, even if the injected fuel does not vaporize as readily in a batch injection, and as a result, the amount of fuel that does not contribute to combustion increases, a substantive insufficiency in the fuel injection quantity due to that increase, and thus deterioration of the combustion state due to that insufficiency, is able to be inhibited.

According to an eighth aspect of the invention, in the fuel injection control apparatus for a direct injection internal combustion engine according to the seventh aspect of the invention, the increase correcting means sets the fuel increase amount based on at least one of an engine temperature and a time elapsed after engine start-up.

Injected fuel tends to vaporize more readily the higher the engine temperature and the temperature of the engine combustion chamber increases over time after the engine is started. Accordingly, vaporization of injected fuel tends to be promoted the more time that passes after start-up.

Regarding this, with the structure according to the eighth aspect of the invention, when increase-correcting the fuel injection quantity so that the fuel increase amount is larger for a batch injection than it is for a split injection, the fuel increase amount can be set according to the extent to which vaporization of injected fuel is promoted, which changes depending on the engine temperature and the time elapsed after engine start-up. Accordingly, it is possible to ensure the amount of fuel that actually contributes to combustion and thus make the combustion state even more stable. The engine temperature can be estimated based on, for example, the engine coolant temperature or the engine lubricating oil temperature, just as with the structure according to the second aspect of the invention.

According to a ninth aspect of the invention, in the fuel injection control apparatus for a direct injection internal combustion engine according to the seventh or eighth aspect of the invention, the increase correction of the fuel injection quantity is performed when the engine is idling until a predetermined period of time has elapsed after engine start-up.

Here, an apparatus is known which increase-corrects the fuel injection quantity while injecting fuel during the intake stroke when the engine is idling until a predetermined period of time has elapsed after engine start-up in order to improve the combustion state. With the structure according to the ninth aspect of the invention, when the fuel injection mode is switched between batch injection and split injection in such an apparatus, it is possible to perform a fuel increase of an amount that is appropriate in view of the extent to which fuel vaporization is promoted and the extent to which fuel adheres to the combustion chamber wall after engine start-up in each injection mode.

A tenth aspect of the invention relates to a fuel injection control apparatus for a direct injection internal combustion engine, which, after start-up when the engine is cold, switches a fuel injection mode between a batch injection in which fuel is injected once and a split injection in which fuel is injected a plurality of times, wherein when increase-correcting a fuel injection quantity set based on an engine operating state, from after engine start-up until a predetermined period of time has passed, the fuel injection mode is set to a first injection mode in which the fuel increase amount for the split injection is set larger than the fuel increase amount for the batch injection, and then the fuel injection mode is set to a second injection mode in which the fuel increase amount for the batch injection is set larger than the fuel increase amount for the split injection.

Fuel does not readily vaporize when the engine is cold, and particularly right after start-up of the internal combustion engine. As a result, fuel adheres to wall surfaces in the internal combustion engine, i.e., the peripheral walls of the cylinder and the piston top-surface (hereinafter also simply referred to as "walls"), and it is highly likely that some of that fuel not contribute to engine combustion and therefore lead to deterioration of the combustion state. On the other hand, the temperature in the engine combustion chamber, as well as the temperature of the inside walls of the engine combustion chamber, gradually increases as time passes after engine start-up, thereby reducing the possibility that some of the injected fuel will adhere to the inside wall of the engine combustion chamber and therefore not contribute to engine combustion. Furthermore, the injected fuel tends to vaporize more readily when it is injected over a plurality of injections as opposed to when it is injected all at once.

In view of this, with the structure according to the tenth aspect of the invention, the fuel increase amount is set larger for a split injection than it is for a batch injection from after engine start-up until a predetermined period of time has elapsed. Then after that, the fuel increase amount is set larger for a batch injection than it is for a split injection. Accordingly, the fuel increase amount can be set in view of changes in the extent to which fuel vaporization is promoted and the extent to which fuel adheres to the cylinder wall after engine start-up, as described above. Accordingly, it is possible to ensure fuel which contributes to combustion and therefore improve the stability of engine combustion.

According to an eleventh aspect of the invention, in the fuel injection control apparatus for a direct injection internal combustion engine according to the tenth aspect of the invention, in the first injection mode, fuel is injected once at the end of a compression stroke in the batch injection while fuel is injected at a plurality of timings, including at least at the end of the compression stroke, in the split injection, and in the second injection mode, fuel is injected once during an intake stroke in the batch injection while fuel is injected a plurality of times during the intake stroke in the split injection.

When the engine is cold the injected fuel does not sufficiently vaporize and there is a tendency for some of the fuel to adhere to the inside wall of the combustion chamber. Also, when the piston is on the top-dead-center (TDC) side, as it is at the end of the compression stroke, the exposed area of wall inside the combustion chamber is small so fuel adherence is inhibited somewhat. On the other hand, however, when fuel is injected at a time other than at the end of the compression stroke, such as at the beginning of the compression stroke, the amount of fuel adherence increases, reducing the percentage of injected fuel that actually contributes to engine combustion. However, when fuel is injected during the intake stroke, even if fuel were to adhere, it is highly likely that that adhered fuel would vaporize within the period of time between fuel injection and ignition. In fact, during the intake stroke fuel tends to vaporize more readily when it is split up and injected over a series of separate injections than when it is injected all at once. Therefore the amount of fuel that does not contribute to engine combustion is greater in a batch injection than it is in a split injection.

Regarding this, with the structure according to the eleventh aspect of the invention, it is possible to set the fuel increase amount according to the extent to which vaporization of injected fuel is promoted and the extent to which fuel adheres to the walls, which changes depending on the timing of the injection of the batch injection and the timings of the injections of the split injection.

According to the twelfth aspect of the invention, in the fuel injection control apparatus for a direct injection internal combustion engine according to the tenth or eleventh aspect of the invention, the fuel increase amount is set based on at least one of an engine temperature and a time elapsed after engine start-up.

The amount of fuel that adheres to the inside wall of the engine combustion chamber tends to increase the lower the engine temperature, and the temperature of the combustion chamber is lower the less time that has elapsed after engine start-up. Accordingly, the amount of fuel that adheres to the inside wall of the combustion chamber tends to increase when that elapsed time is short.

Regarding this, with the structure according to the twelfth aspect of the invention, when the fuel injection quantity is increase-corrected so that the fuel increase amount is larger for a split injection than it is for a batch injection, that fuel increase amount can be set in view of the fuel adhering amount which changes in response to the engine temperature or the time that has elapsed after engine start-up. Accordingly, it is possible to ensure the amount of fuel that actually contributes to combustion and thus further stabilize the combustion state. The engine temperature can be estimated based on, for example, the engine coolant temperature or the engine lubricating oil temperature.

According to a thirteenth aspect of the invention, the fuel injection control apparatus for a direct injection internal combustion engine according to any one of the tenth to the twelfth aspects of the invention further includes split rate setting means for setting an injection quantity split rate of each injection when the fuel injection mode is set to the split injection. Further, the split rate setting means sets the injection quantity split rate of each injection such that the difference between the injection quantity split rates becomes less the smaller the total quantity of fuel injected by all of the injections of the split injection.

Typically, when the target fuel injection quantity is small, i.e., when the total quantity of fuel to be injected by all of the injections in a split injection is small, the operational response of the fuel injection valve must be extremely fast because the interval between the time that the fuel injection valve is open and the time that it is closed is short. As a result, if the fuel injection quantity of any of the injections is set too small, the fuel injection may not be able to be performed properly due to a limit in the operational response of the fuel injection valve. However, when the target fuel injection quantity is large, i.e., when the total quantity of fuel to be injected by all of the injections in a split injection is large, the fuel injection quantity of an injection is less likely to be below the operational response limit of the fuel injection valve. As a result, there is more freedom when setting the injection quantity split rates of the injections.

Regarding this, with the structure according to the thirteenth aspect of the invention, when the total quantity of fuel injected by the injections of the split injection is small, i.e., when the fuel injection quantity of any of the injections is extremely small depending on the setting of the injection quantity split rates, the injection quantity split rates of the injections are set so that the difference between them is small. Accordingly, it is possible to inhibit, to the greatest extent possible, the fuel injection quantity of each injection in a split injection from becoming too small, which makes it possible to ensure proper fuel injection operation in each injection. Moreover, when the total fuel quantity is large, the injection quantity split rates of the injections are set so that the difference between them is large, which means that they can be set with a high degree of freedom.

According to a fourteenth aspect of the invention, in the fuel injection control apparatus for a direct injection internal combustion engine according to the thirteenth aspect of the invention, the split rate setting means sets the injection quantity split rate of each injection such that the injection quantity split rates become equal when the total quantity of fuel injected by all of the injections of the split injection is equal to, or less than, a predetermined quantity.

With this structure, when the total quantity of fuel to be injected by all of the injections of a split injection is equal to, or less than, a predetermined value, i.e., when the total fuel injection quantity is split unevenly and the fuel injection quantity of an injection may fall below the minimum fuel injection quantity of the fuel injection valve, the injection quantity split rates of the injections are set to be equal. It is therefore possible to avoid, to the greatest extent possible, a situation occurring in which normal injection is no longer possible due to a fuel injection quantity of one of the injections of a split injection falling below the minimum fuel injection quantity of the fuel injection valve. As a result, split injections can be executed more often.

The method for setting the injection quantity split rates described in the thirteenth or fourteenth aspect of the invention is particularly effective when fuel injection mode is set to the first injection mode, but may also be employed when the fuel injection mode is set to the second injection mode or regardless of which mode the fuel injection mode is set to.

According to the fifteenth aspect of the invention, in the fuel injection control apparatus for a direct injection internal combustion engine according to any one of the tenth to the fourteenth aspects of the invention, the increase correction of the fuel injection quantity is performed when the engine is idling until a predetermined period of time has elapsed after engine start-up.

Here, an apparatus is known which increase-corrects the fuel injection quantity when the engine is idling until a predetermined period of time has elapsed after engine start-up in order to raise the exhaust gas temperature and improve the combustion state. With the structure according to the fifteenth aspect of the invention, when the fuel injection mode is switched between batch injection and split injection in such an apparatus, a fuel increase can be performed of an amount that is appropriate in view of the extent to which fuel adheres to the walls and the extent to which fuel vaporizes in each injection mode.

A sixteenth aspect of the invention relates to a fuel injection control method for a direct injection internal combustion engine, which, when the engine is cold, switches a fuel injection mode between a batch injection in which fuel is injected once at the end of a compression stroke and a split injection in which fuel is injected at a plurality of timings including at least at the end of the compression stroke. In this method, a fuel increase amount is set larger for the split injection than for the batch injection when increase-correcting a fuel injection quantity set based on an engine operating state.

A seventeenth aspect of the invention relates to a fuel injection control method for a direct injection internal combustion engine, which, when the engine is cold, switches a fuel injection mode between a batch injection in which fuel is injected once during an intake stroke and a split injection in which fuel is injected a plurality of times during the intake stroke. In this method, a fuel increase amount is set larger for the batch injection than for the split injection when increase-correcting a fuel injection quantity set based on an engine operating state.

An eighteenth aspect of the invention relates to a fuel injection control method for a direct injection internal combustion engine, which, after start-up when the engine is cold, switches a fuel injection mode between a batch injection in which fuel is injected once and a split injection in which fuel is injected a plurality of times. In this method, when increase-correcting a fuel injection quantity set based on an engine operating state, from after engine start-up until a predetermined period of time has passed, the fuel injection mode is set to a first injection mode in which the fuel increase amount for the split injection is set larger than the fuel increase amount for the batch injection, and then the fuel injection mode is set to a second injection mode in which the fuel increase amount for the batch injection is set larger than the fuel increase amount for the split injection.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

Figure 1:
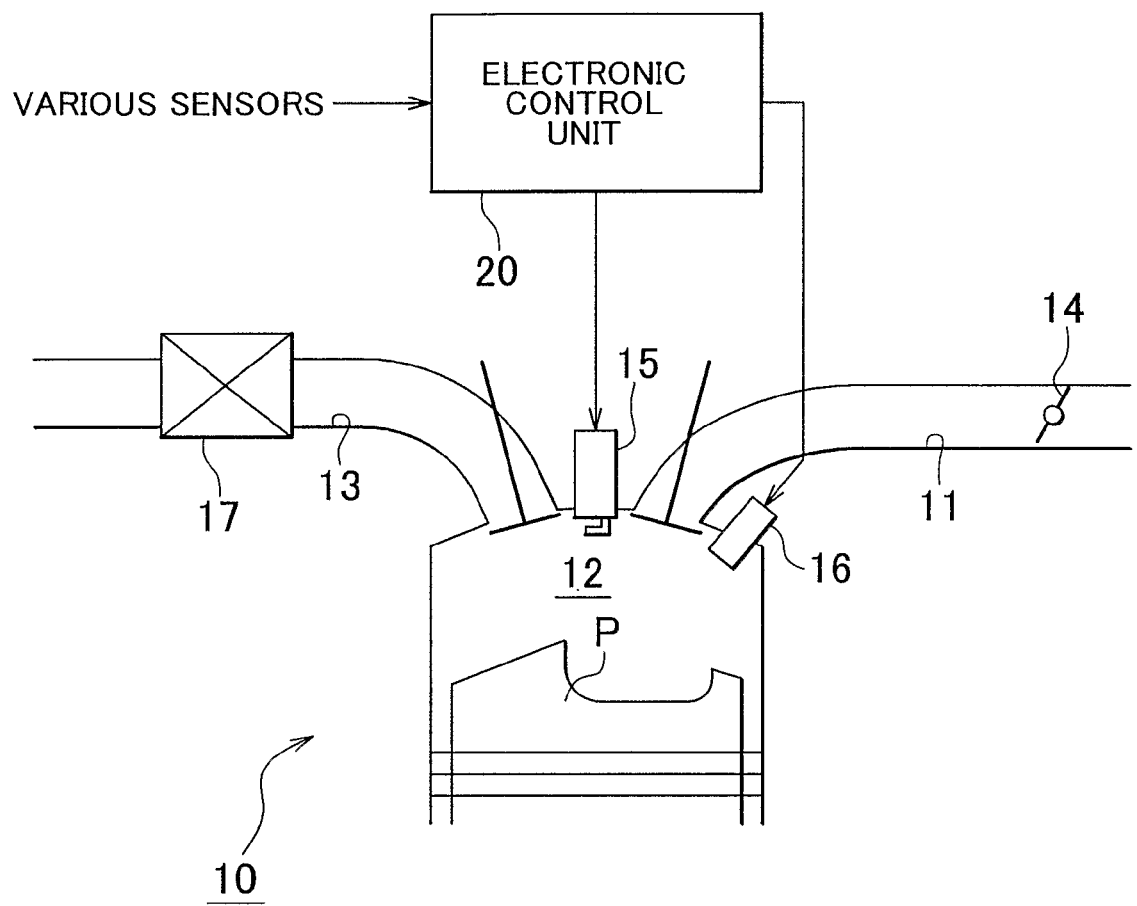
FIG. 1 is a block diagram schematically showing a concrete fuel injection control apparatus for an internal combustion engine according to one exemplary embodiment of the invention.

Hereinafter, a specific fuel injection control apparatus for an internal combustion engine according to one exemplary embodiment of the invention will be described. As shown in FIG. 1, an internal combustion engine 10 to which this exemplary embodiment can be applied is largely constructed of an intake passage 11, a combustion chamber 12, and an exhaust passage 13. A throttle valve 14 is arranged in the intake passage 11 and a spark plug 15 and an injection valve 16 are arranged in the combustion chamber 12. Further, an exhaust gas control catalyst 17 is provided in the exhaust passage 13.

When the internal combustion engine 10 is operating, air drawn in from outside is introduced into the combustion chamber 12 through the intake passage 11. The amount of air introduced into the combustion chamber 12 is adjusted by controlling the opening amount of the throttle valve 14.

Fuel from the fuel injection valve 16 is introduced directly into the combustion chamber 12, where it is mixed with the air introduced from the intake passage 11. This mixture of fuel and air is then ignited by a spark discharge from the spark plug 15, upon which the mixture is combusted. Exhaust gas generated from the combustion is then discharged into the exhaust passage 13 where it is purified by the exhaust gas control catalyst 17.

Fuel injection control in the internal combustion engine 10 is performed by an electronic control unit (hereinafter, simply referred to as "ECU") 20. This ECU 20 includes, for example, a central computing and processing unit which executes various routines related to engine control, memory for storing programs for engine control and information necessary for such control, an input port into which signals from other components are input, and an output port for outputting signals to other components.

Various kinds of sensors for detecting the operating state of the engine are connected to the input port of the ECU 20. Some specific examples of these sensors include an engine speed sensor for detecting a rotation speed of an engine output shaft (i.e., engine speed NE), an acceleration sensor for detecting an operating amount of an accelerator pedal (i.e., an accelerator operating amount AC), a coolant temperature sensor for detecting the temperature of engine coolant (i.e., coolant temperature THW), and an intake amount sensor for detecting an intake air amount GA. In addition, an ignition switch that is operated when the internal combustion engine 10 is started and the like is also connected to the input port of the ECU 20. Further, the spark plug 15 and fuel injection valve 16 and the like are connected to the output port of the ECU 20.

The ECU 20 performs fuel injection control in which it calculates a target injection quantity Qop based on the operating state of the engine (more specifically, based on the engine speed NE, the intake air amount GA, the accelerator operating amount AC, the coolant temperature THW, and the like), and drives the fuel injection valve 16 in accordance with that target injection quantity Qop. As a result, fuel of an amount appropriate for the operating state of the engine at that time is injected. Also, in conjunction with setting the target injection quantity Qop, the ECU 20 also adjusts the intake air amount GA and the ignition timing from the spark plug 15 so as to obtain the optimum combustion state.

With the fuel injection control when the engine is cold, control for rapidly warming up the exhaust gas control catalyst 17 (i.e., catalyst rapid warm-up control) is performed so as to initiate exhaust gas purification early on. In addition, control for improving the combustion state (i.e., combustion improvement control) is also executed.

Hereinafter, the catalyst rapid warm-up control and combustion improvement control will be described separately, with the catalyst rapid warm-up control being described first. This catalyst rapid warm-up control is executed when the all of the following conditions have been satisfied.

Start-up of the internal combustion engine 10 is complete and the internal combustion engine 10 is running under its own power.

The coolant temperature THW at the beginning of start-up of the internal combustion engine 10 is low.

The internal combustion engine 10 is idling.

Catalyst rapid warm-up control aims to improve early activation of the exhaust gas control catalyst 17 by raising the exhaust gas temperature by performing a fuel injection at the end of the compression stroke, increasing the intake air amount GA, increasing the fuel injection quantity, and retarding the ignition timing. The reason for injecting fuel at the end of the compression stroke is to achieve so-called stratified-charge combustion, or engine combustion in which a rich flammable mixture is unevenly distributed near the spark plug 15. By performing stratified-charge combustion it is possible to significantly retard the ignition timing and greatly increase the intake air amount GA compared with when homogeneous combustion, which will be described later, is performed. As a result, the exhaust gas temperature can be set extremely high.

If too much fuel is injected at the end of the compression stroke, the air-fuel ratio around the spark plug 15 becomes excessively rich, which results in the deterioration of the combustion state of the mixture. In this case, therefore, the fuel is split up and injected over a plurality of injections so that the air-fuel ratio around the spark plug 15 is suitable. With this kind of fuel injection (i.e., a split injection), the split may be such that the fuel is injected twice: once at the beginning of the compression stroke (i.e., 180° BTDC) and once at the end of the compression stroke (i.e., 30° BTDC), for example.

Typically, when the fuel injection quantity is small, i.e., when the total quantity of fuel to be injected over the plurality of injections in a split injection is small, the interval between the time when the fuel injection valve 16 is open and when it is closed is short, which means that the fuel injection valve 16 must be highly responsive. Thus, if the fuel injection quantity is split, there is a possibility that the split fuel quantity may be less than the minimum fuel injection quantity of the fuel injection valve 16 (more specifically, less than the injection quantity lower limit which is determined by the limit in the operational response of the fuel injection valve 16), making it no longer possible to adjust the injection quantity. Accordingly in this case, the injection is performed only once (i.e., a batch injection), with fuel being injected at the end of the compression stroke (e.g., at 25° BTDC). A batch injection can also be performed when the air-fuel ratio around the spark plug 15 can be made appropriate, even if all of the fuel is injected at the end of the compression stroke.

The determination as to whether to perform a split injection or a batch injection is fundamentally made based upon the total quantity of fuel to be injected into one cylinder during one cycle (a sequence including an intake stroke, a compression stroke, a combustion stroke, and an exhaust stroke) of the internal combustion engine 10.

Here, when the engine is cold, there is a tendency for injected fuel not to vaporize sufficiently and adhere to the inside wall of the combustion chamber 12. Also, when the engine piston (hereinafter simply referred to as "piston") P is on the top-dead-center (TDC) side, as it is at the end of the compression stroke, the exposed area of the inside wall of the combustion chamber 12 is small so the adherence of fuel is somewhat limited. Despite this, however, when fuel is injected at a timing other than at the end of the compression stroke, such as at the beginning of the compression stroke, the amount of fuel that adheres to the inside wall of the combustion chamber 12 is large. As a result, the percentage of injected fuel that actually contributes to engine combustion decreases.

Given this, this exemplary embodiment is such that when an increase correction amount Kc is calculated to increase-correct the fuel injection quantity during catalyst rapid warm-up control, a larger value is calculated for that increase correction amount Kc for a split injection than for a batch injection. As a result, the fuel injection quantity is increased more for a split injection, in which the amount of fuel that adheres to the inside wall of the combustion chamber 12 increases, than for a batch injection, which suppresses a substantive fuel injection quantity insufficiency caused by the increased amount of fuel that adheres.

Next, the control for improving combustion will be described. Combustion improving control is executed when the all of the following conditions have been satisfied.
  Start-up of the internal combustion engine 10 is complete and the internal combustion engine 10 is running under its own power.
  The coolant temperature THW is low.
  The internal combustion engine 10 is idling.
  Catalyst rapid warm-up control is not being executed.

Combustion improving control aims to improve the combustion state by compensating for a lack of fuel vaporization action by increasing the quantity of fuel supplied for combustion through an increase correction of the fuel injection quantity. During combustion improvement control, a fuel injection is executed at the intake stroke of the internal combustion engine 10. In this fuel injection at the intake stroke, so-called homogeneous combustion, or engine combustion with the fuel evenly dispersed in the combustion chamber 12, is performed.

In combustion improvement control as well, the fuel injection mode can be switched between batch injection and split injection. According to this exemplary embodiment, for example, in a batch injection, fuel is injected only once at the beginning of the intake stroke (e.g., 300° BTDC), and in a split injection, fuel is injected twice: once at the early-middle of the intake stroke (240° BTDC) and once at the end of the intake stroke (180° BTDC). The regions in which the batch and split injections are respectively executed are determined by, for example, the intake air amount GA, the engine speed NE, the coolant temperature THW, and the region appropriate for the fuel injection mode is then obtained and set based on experimental results, for example.

Here, as described above; when the engine is cold; the fuel that is injected does not to vaporize sufficiently and there is a tendency for some of it to adhere to the inside wall of the combustion chamber 12. When fuel is injected during the intake stroke, however, even if some of the fuel were to adhere, it is highly likely that the adhered fuel would vaporize during the period between the time the fuel was injected and ignition. In fact, vaporization tends to be promoted more when fuel injected during the intake stroke is split up and injected over a series of separate injections than when it is injected all at once. Therefore there is more fuel that does not contribute to engine combustion in a batch injection than there is in a split injection.

Based on this, according to this exemplary embodiment, when calculating the increase correction coefficient (hereinafter, simply referred to as the "correction coefficient") Kb to increase-correct the fuel injection quantity in combustion improvement control, a larger value is calculated for the correction coefficient Kb with a batch injection than with a split injection. Accordingly, the fuel injection quantity is increased more for a batch injection, in which the amount of fuel that does not contribute to combustion increases due to insufficient vaporization of the injected fuel, than it is for a split injection, thereby suppressing a substantive insufficiency in the fuel injection quantity due to the increase in the amount of fuel that does not contribute to combustion.

Hereinafter, the routine for calculating the increase correction amount Kc in the catalyst rapid warm-up control and the routine for calculating the target injection quantity Qop which includes the routine for calculating the correction coefficient Kb in combustion improvement control will be described.

Figure 2:
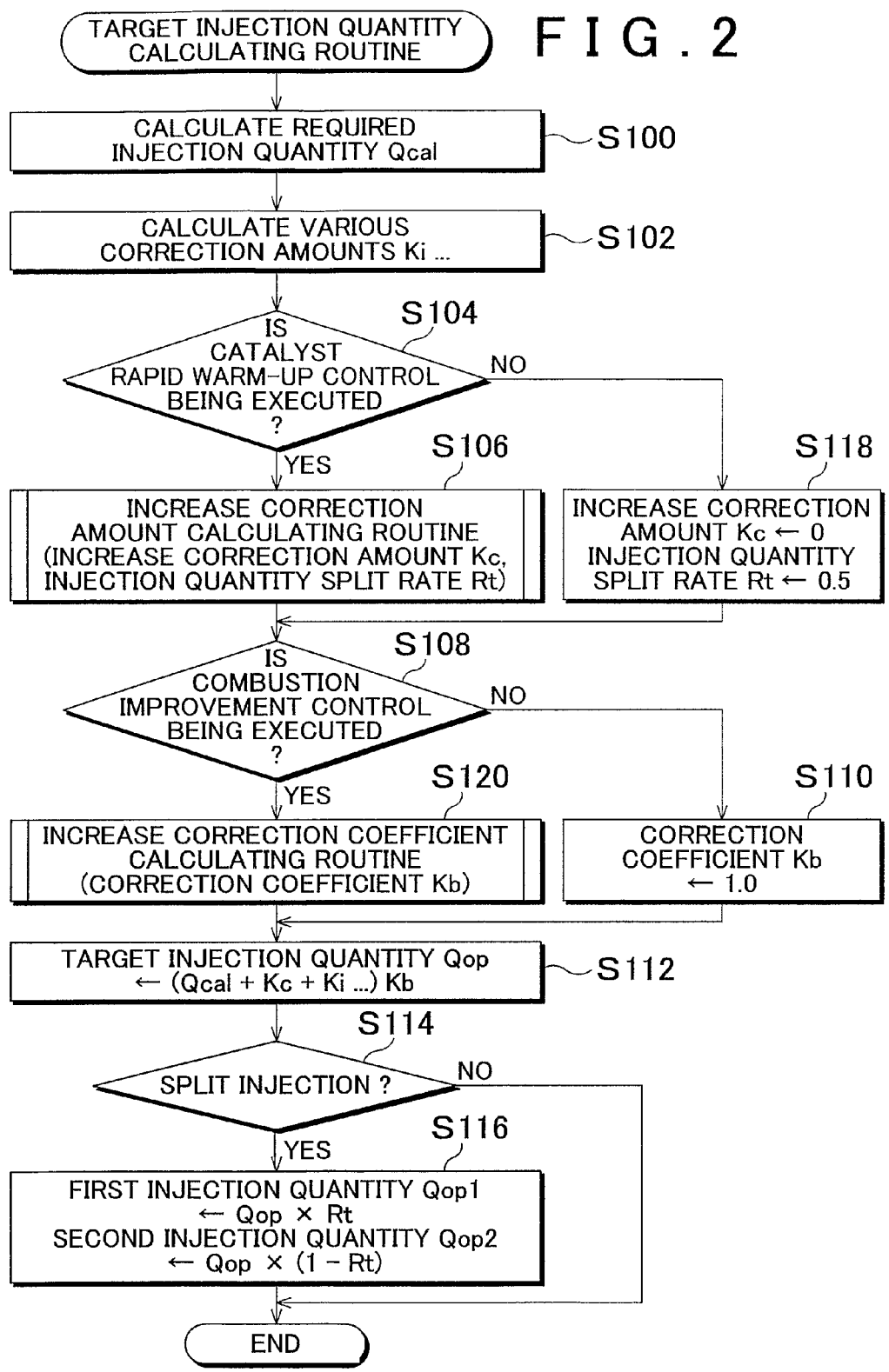
FIG. 2 is a flowchart illustrating the order of specific steps in a target injection quantity calculation routine.
Figure 3:
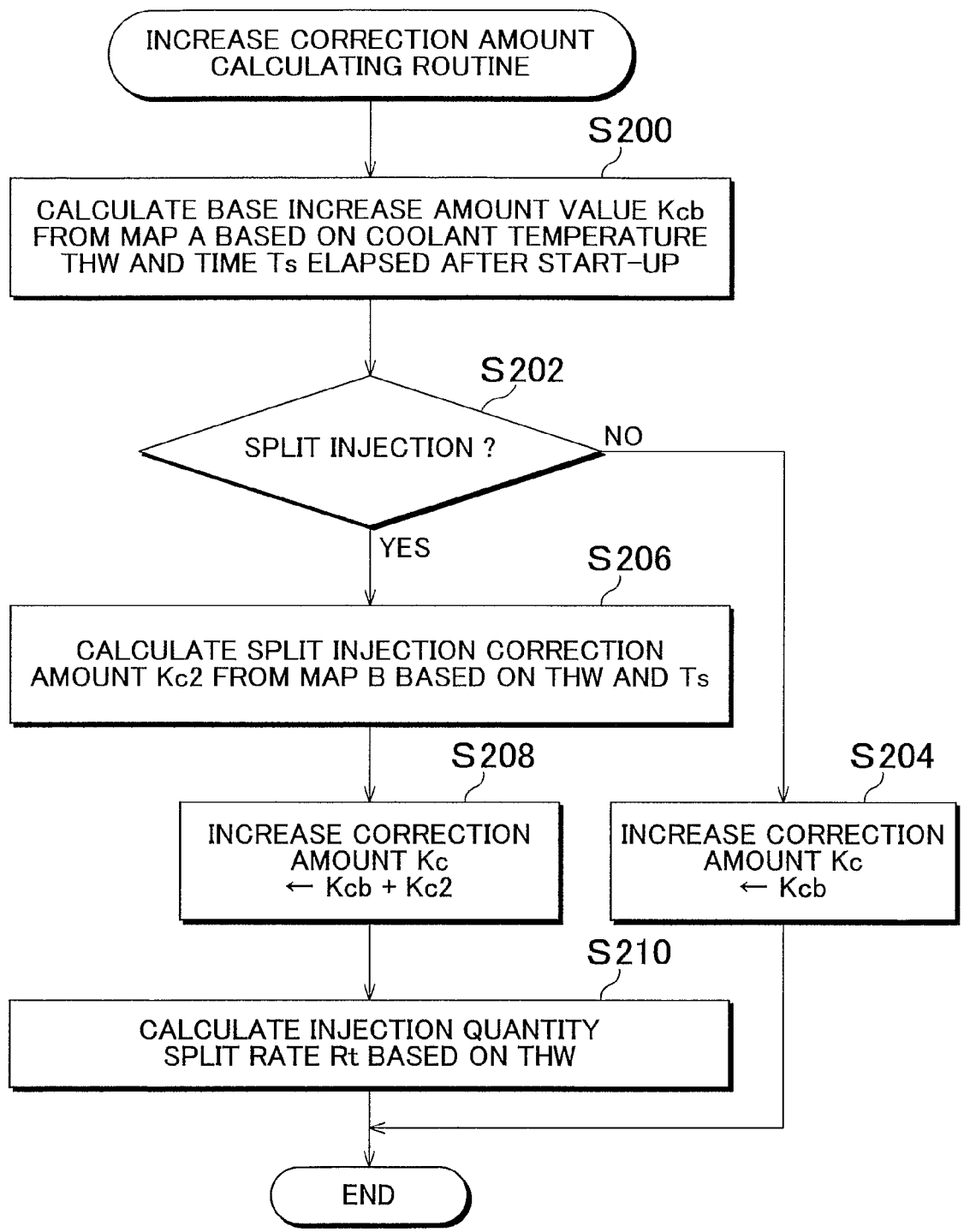
FIG. 3 is a flowchart illustrating the order of specific steps in an increase correction amount calculation routine.

First, the routine for calculating the target injection quantity Qop during execution of the catalyst rapid warm-up control will be described with reference to the flowcharts shown in FIGS. 2 and 3. The series of steps shown in the flowchart in FIG. 2 illustrates the specific process for calculating the target injection quantity Qop. The series of steps shown in the flowchart in FIG. 3 illustrates the specific process for calculating the increase correction amount Kc. These routines are executed by the ECU 20 at predetermined cycles.

As shown in FIG. 2, when calculating the target injection quantity Qop, a required injection quantity Qcal is first calculated based on, for example, the engine speed NE, the intake air amount GA, or the accelerator operating amount AC (i.e., step S100). Then various correction amounts (i.e., Ki, ... ) other than the correction coefficient Kb and the increase correction amount Kc, such as the correction amount for the intake air temperature, the correction amount for atmospheric pressure, and the correction amount for the coolant temperature THW, are calculated (i.e., step S102).

Because the catalyst rapid warm-up control is being executed at this time (i.e., YES in step S104), the routine for calculating the increase correction amount Kc for the catalyst rapid warm-up control is executed (i.e., step S106).

As shown in FIG. 3, when calculating the increase correction amount Kc, a base increase amount value Kcb is first calculated from a map A based on the coolant temperature THW as the indication value for the engine temperature, and the time elapsed after the ignition switch has been operated to start the internal combustion engine 10 (i.e., time Ts elapsed after start-up) (i.e., step S200).

For this base increase value Kcb, a value may be calculated which is able to facilitate early warm-up of the exhaust gas control catalyst 17 while enabling stable operation of the internal combustion engine 10 when batch injection is selected. The relationship between that base increase amount value Kcb, and the coolant temperature THW and the time Ts elapsed after start-up is obtained through experimental results or the like and set on the map A.

Figure 4:
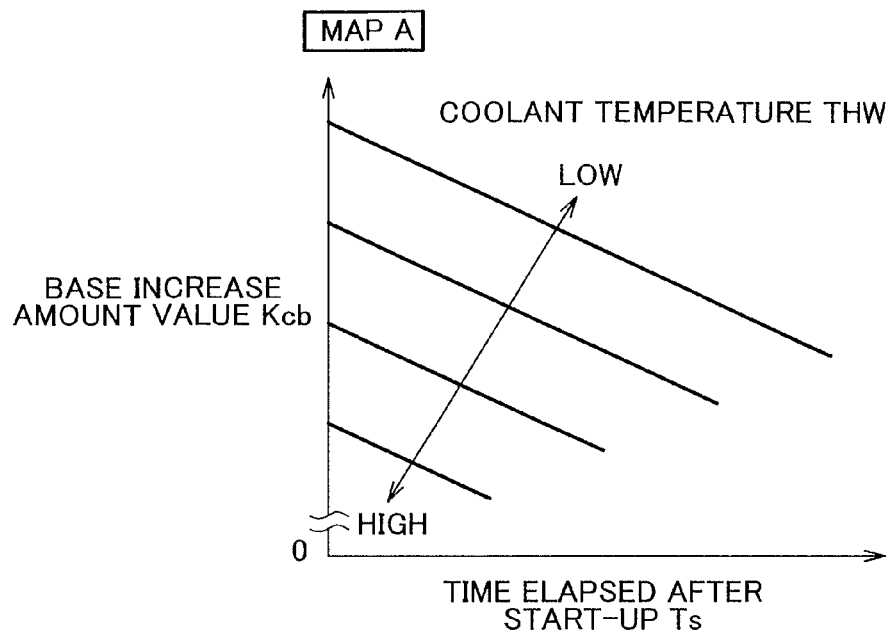
FIG. 4 is a schematic illustration of a map A used for calculating a base increase amount value.

The amount of fuel that adheres to the inside wall of the combustion chamber 12 tends to increase the lower the engine temperature. Also, the temperature of the combustion chamber 12 is lower the closer to start-up (i.e., the less time that has elapsed after start-up), so there is a tendency for the amount of fuel that adheres to the inside of the combustion chamber 12 to be greater the shorter that elapsed time. Based on this, according to this exemplary embodiment, the base increase amount value Kcb is calculated to be a larger value the lower the coolant temperature THW and the shorter the time Ts elapsed after start-up, to be specific, as is conceptually shown in map A in FIG. 4. As a result, it is possible to calculate the increase correction amount Kc in view of the amount of fuel that adheres, which changes depending on the engine temperature and the time Ts elapsed after start-up. Accordingly, it becomes possible to ensure the amount of fuel that actually contributes to combustion.

Then when batch injection is selected (i.e., NO in step S202 in FIG. 3) the base increase value Kcb is set as the increase correction amount Kc (i.e., step S204). When split injection is selected (i.e., YES in step S202), on the other hand, a split injection correction amount Kc2 is calculated from a map B based on the coolant temperature THW and the time Ts elapsed time after start-up (i.e., step S206). For this split injection correction amount Kc2, a value may be calculated that can compensate for the insufficiency that is due to the split injection being selected, from the fuel injection quantity insufficiency that is due to the increase in the amount of fuel that adheres to the inside wall of the combustion chamber 12. The relationship between that split injection correction amount Kc2, and the coolant temperature THW and the time Ts elapsed after start-up is obtained through experimental results or the like and set on map B. The split injection correction amount Kc2 is calculated to be a larger value the lower the coolant temperature THW and the shorter the time Ts elapsed after start-up, to be specific.

For the increase correction amount Kc, a value which is the sum of the base increase amount value Kcb and the split injection correction amount Kc2 (i.e., Kcb+Kc2) is calculated (i.e., step S208). Further, an injection quantity split rate Rt for the first fuel injection is calculated from a map C based on the coolant temperature THW (i.e., step S210). Hereinafter, the manner in which the injection quantity split rate Rt is calculated will be described with reference to FIG. 5 which conceptually shows map C.

Figure 5:
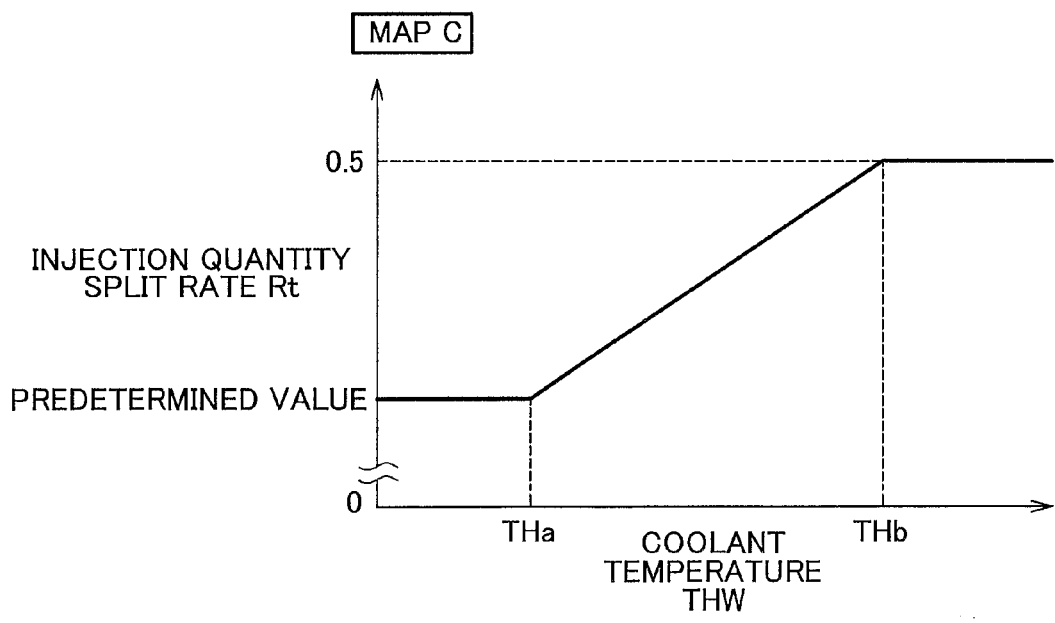
FIG. 5 is a schematic illustration of a map C used for calculating an injection amount split rate.

As shown in FIG. 5, when the coolant temperature THW is equal to, or greater than, a predetermined temperature THb, the injection amount split rate Rt is calculated to be 0.5. At this time, when the total quantity of fuel to be injected over the injections is small and the total fuel injection quantity is split unequally, a situation may occur in which the fuel injection quantity of either injection falls below the minimum fuel injection quantity of the fuel injection valve 16 such that normal injection is no longer possible. Therefore, the injection quantity split rate Rt is set so that the injection quantity split rates of the injections are equal. As a result, the foregoing situation can be avoided to the greatest extent possible, and split injections can be executed more often.

Meanwhile, when the coolant temperature THW is lower than the predetermined temperature THb but higher than a predetermined temperature THa, the injection quantity split rate Rt is calculated to be a value that is smaller than 0.5 but which approaches 0.5 the higher the coolant temperature THW becomes.

At this time, the total quantity of fuel to be injected from both injections is relatively small, and depending on the settings of the injection quantity split rates, the fuel injection quantity of one injection or the other may be too small. The injection quantity split rate Rt is therefore set so that the difference between the injection quantity split rates of the injections is relatively small. Accordingly it is possible to suppress, to the greatest extent possible, the fuel injection quantity of each injection in a split injection from becoming too small, and therefore possible to ensure proper fuel injection operation in each injection. Also at this time, the injection quantity split rate Rt is set such that the fuel injection quantity of the second injection (i.e., at the end of the compression stroke) in a split injection is greater than the fuel injection quantity of the first injection (i.e., at the beginning of the compression stroke), which enables stratified-charge combustion to be performed relatively stably.

On the other hand, when the coolant temperature THW is equal to, or less than, the predetermined temperature THa, the injection quantity split rate Rt is calculated to be a predetermined value (such as 0.3). At this time, the total quantity of fuel to be injected by both injections is large and there is a high degree of freedom when setting the injection quantity split rates of the injections of a split injection. Therefore, the injection quantity split rate Rt is calculated to be a predetermined value that enables stratified-charge engine combustion to be performed stably. This predetermined value is obtained and set base on experimental results or the like.

After the increase correction amount Kc and the injection quantity split rate Rt have been calculated as described above, this cycle of the routine for calculating the increase correction amount Kc for the catalyst rapid warm-up control ends. Then as shown in FIG. 2, in the step for calculating the target injection quantity Qop, since combustion improvement control is not being executed at this time (i.e., NO in step S108), the correction coefficient Kb is calculated as a value of 1.0 which does not increase-correct the fuel injection quantity (i.e., step S10).

The target injection quantity Qop is calculated from the following expression (1) based on the required injection quantity Qcal, the various correction amounts Ki . . . , the increase correction amount Kc, and the correction coefficient Kb (i.e., step S112).

$$Qop \leftarrow (Qcal + Kc + Ki + \ldots)Kb \quad (1)$$

When a batch injection is selected (i.e., NO in step S114), the fuel injection valve 16 is driven according to the target injection quantity Qop and the fuel injection quantity is adjusted.

When a split injection is selected (i.e., YES in step S114), on the other hand, target injection quantities Qop1 and Qop2 for the two injections are both calculated from the following expressions (2) and (3) based on the target injection quantity Qop and the injection quantity split rate Rt (i.e., step S116).

first injection quantity $Qop1 \leftarrow Qop \times Rt$ (2)

second injection quantity $Qop2 \leftarrow Qop \times (1-Rt)$ (3)

The fuel injection valve 16 is then driven and the fuel injection quantity for the first injection is then adjusted in accordance with the first injection quantity Qop1 for the first injection (i.e., at the beginning of the compression stroke). Similarly, the fuel injection valve 16 is driven and the fuel injection quantity for the second injection is adjusted in accordance with the second injection quantity Qop2 for the second injection (i.e., at the end of the compression stroke).

In this exemplary embodiment, the fuel injection mode in the catalyst rapid warm-up control described above corresponds to a first injection mode in which the fuel increase amount from after engine start-up until after a predetermined period of time has passed is set larger for a split injection than it is for a batch injection. The predetermined period of time in this case is a period of time for which the catalyst rapid warm-up control is executed, and is set based on the engine temperature. More specifically, this predetermined period of time is set longer the lower the engine temperature at engine start-up. The predetermined period of time is set in this way because there is a greater possibility of the outside air temperature being low the lower the engine temperature, which means that more time is required to warm up the exhaust gas control catalyst 17.

Figure 6:
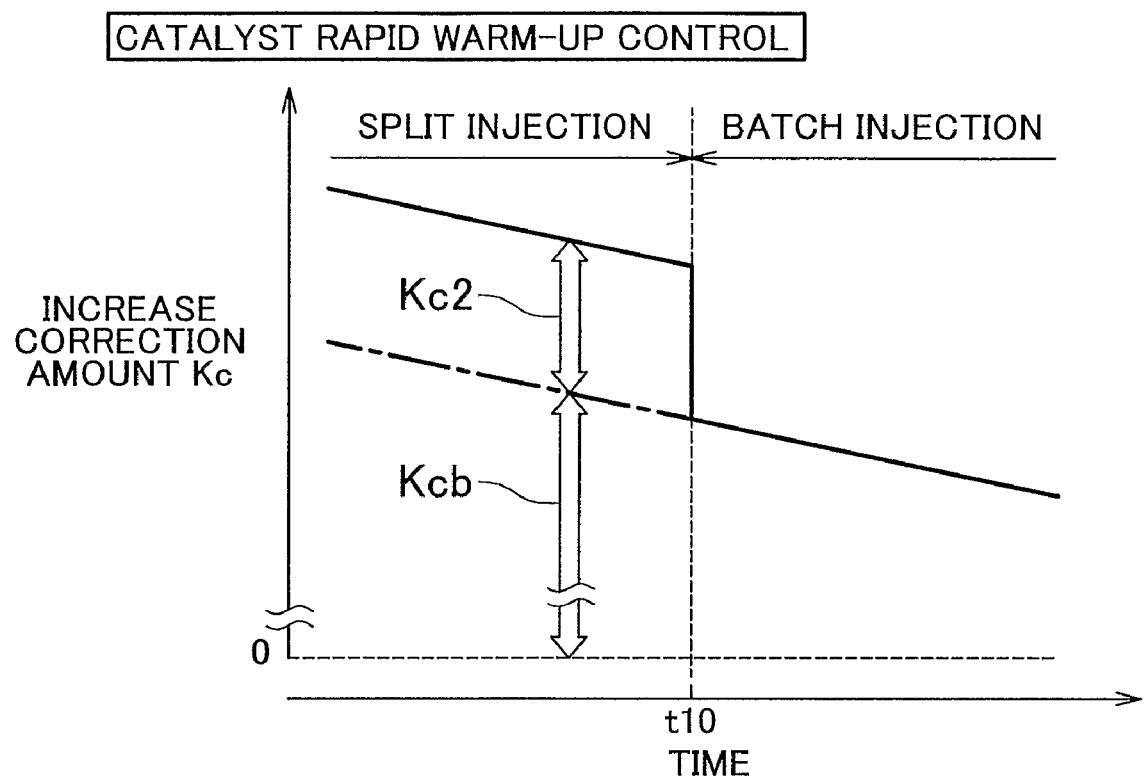
FIG. 6 is a timing chart showing one example of a manner in which an increase correction amount is calculated.

FIG. 6 shows one example of a manner in which the increase correction amount Kc is calculated when the injection mode is switched between split injection and batch injection while catalyst rapid warm-up control is being executed. As shown in the drawing, the increase correction amount Kc when a split injection is selected (i.e., before time t10) is calculated to be a value which is larger than the increase correction amount Kc when a batch injection is selected by an amount corresponding to the split injection correction value Kc2. Therefore, even if the amount of fuel that adheres to the inside wall of the combustion chamber 12 increases when a split injection is selected, a substantive insufficiency in the fuel injection quantity due to that increase, and thus deterioration of the combustion state due to that insufficiency, is able to be inhibited. As a result, it is possible to achieve both stable operation of the internal combustion engine 10 and early warm-up of the exhaust gas control catalyst 17 when either a split injection or a batch injection (after time t10) is selected.

Next, the process for calculating the target injection quantity Qop when combustion improvement control is executed will be described with reference to the flowcharts shown in FIGS. 2 and 7. The series of steps shown in the flowchart in FIG. 7 illustrates a specific routine for calculating the correction coefficient Kb, which is executed by the ECU 20 at predetermined cycles.

As shown in FIG. 2, when the target injection quantity Qop is calculated, the required injection quantity Qcal is first calculated (i.e., step S100) and the various correction amounts (Ki, . . . ) are calculated (i.e., step S102). Because catalyst rapid warm-up control is not being executed at this time (i.e., NO in step S104), the increase correction amount Kc is set to a value that does not increase-correct the fuel injection quantity (more specifically, a value of 0) (i.e., step S118). Also, the injection quantity split rate Rt is set at a value of 0.5 at this time.

Then, because combustion improvement control is being executed at this time (i.e., YES in step S108), a routine to calculate the correction coefficient Kb for combustion improvement control is executed (i.e., step S120).

Figure 7:
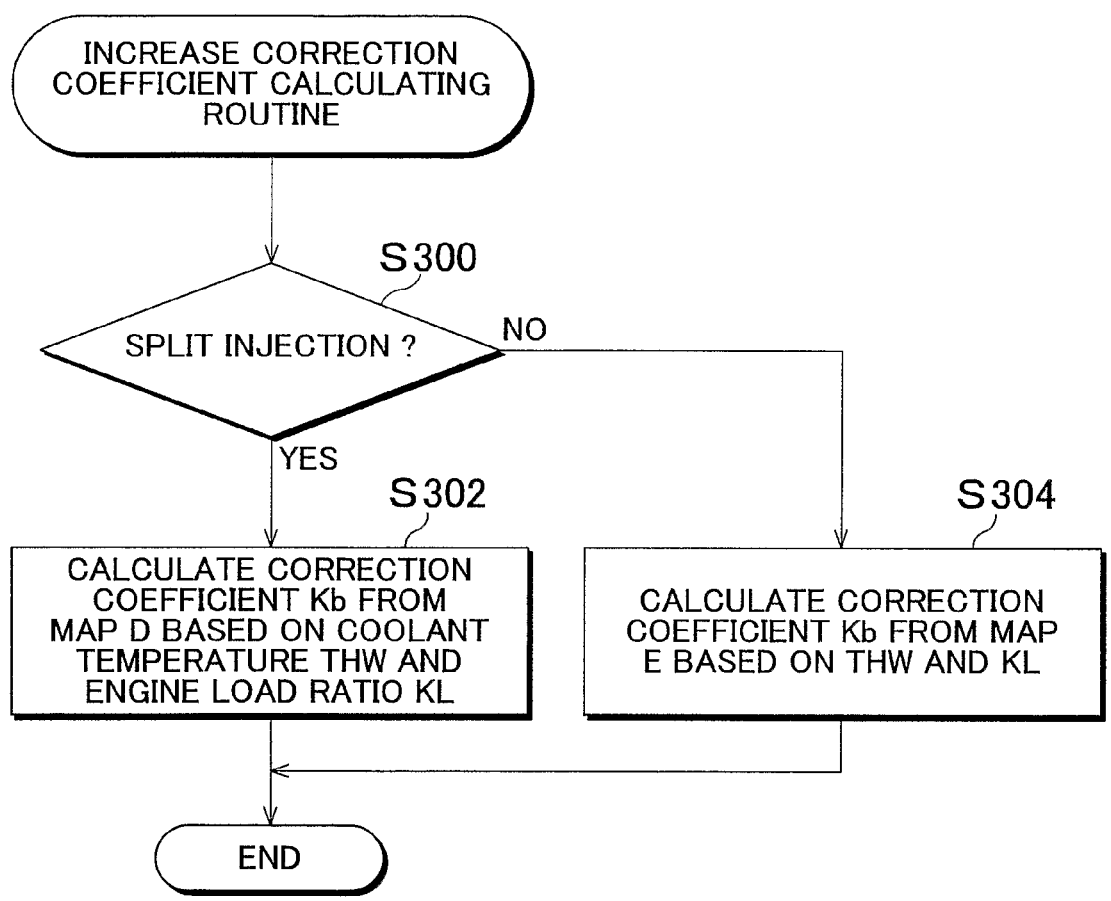
FIG. 7 is a flowchart illustrating the order of specific steps in an increase correction coefficient calculation routine.

More specifically, as shown in FIG. 7, when a split injection is selected (i.e., YES in step S300), the correction coefficient Kb is calculated from a map D based on the coolant temperature THW and an engine load ratio KL (=GA/NE) (i.e., step S302). When a batch injection is selected (i.e., NO in step S300), on the other hand, the correction coefficient Kb is calculated from a map E based on the coolant temperature THW and the engine load ratio KL (i.e., step S304).

Map D and map E are both maps for calculating the correction coefficient Kb as a value that is able to improve the combustion state while maintaining stable operation of the internal combustion engine 10. The relationship between the correction coefficient Kb, and the coolant temperature THW and the engine load ratio KL is obtained through experimental results or the like and then set on each of the maps.

Here, because injected fuel tends to vaporize more readily the higher the engine temperature, the amount of fuel that actually contributes to combustion is also greater. Further, because the fuel injection quantity is adjusted to be greater the higher the engine load ratio KL, the amount of fuel that contributes to combustion increases.

Figure 8:
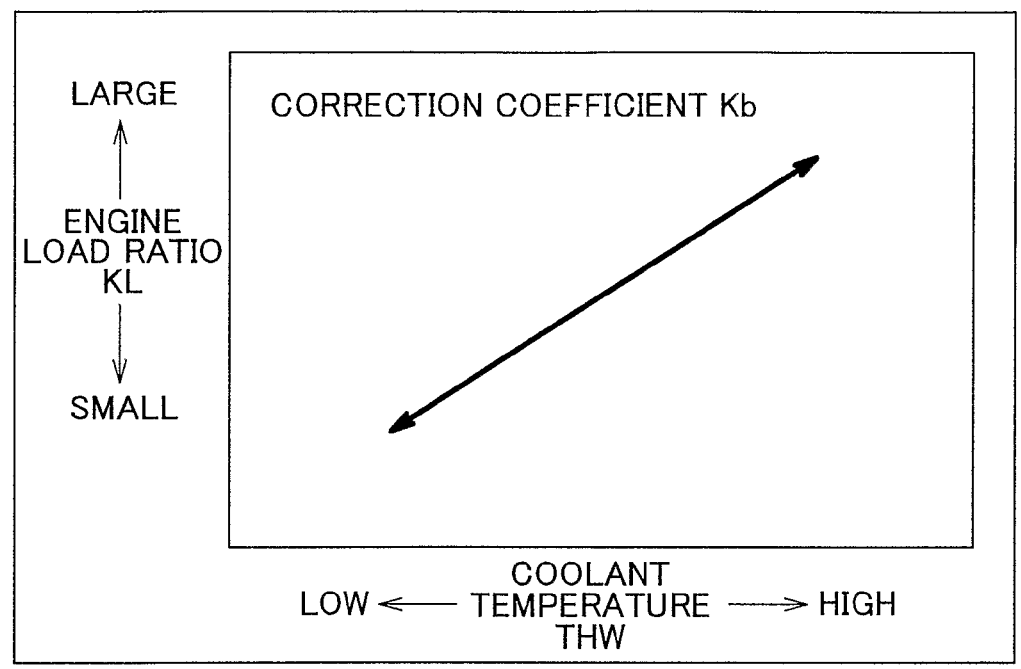
FIG. 8 is a schematic illustration of maps used for calculating the increase correction coefficient.

Therefore, in this exemplary embodiment, the correction coefficient Kb is calculated to be a smaller value the higher the coolant temperature THW as well as when the engine load ratio KL is large, as maps D and E conceptually show in FIG. 8. As a result, it is possible to calculate the correction coefficient Kb in view of the fuel adhering amount which changes depending on the engine load ratio KL and the degree to which vaporization of the injected fuel is promoted, which in turn changes depending on the engine temperature. Accordingly, it becomes possible to ensure the amount of fuel that actually contributes to combustion.

However, map D and map E are set such that the correction coefficient Kb that is calculated from map D is a smaller value than the correction coefficient Kb that is calculated from map E when the coolant temperature THW and the engine load ratio KL are under the same conditions.

After the correction coefficient Kb is calculated as described above, the target injection quantity Qop is calculated from the foregoing relational expression (1) based on the required injection quantity Qcal, the various correction amounts Ki . . . , the increase correction amount Kc, and the correction coefficient Kb, as shown in FIG. 2.

When a batch injection is selected (i.e., NO in step S114), the fuel injection valve 16 is driven according to the target injection quantity Qop and the fuel injection quantity is adjusted. When a split injection is selected (i.e., YES in step S114), on the other hand, target injection quantities Qop1 and Qop2 for the two injections are both calculated from the foregoing relational expressions (2) and (3) based on the target injection quantity Qop and the injection quantity split rate Rt (i.e., step S116). The fuel injection valve 16 is then driven according to the target injection quantities Qop1 and Qop2 and the fuel injection quantities for the two injections are adjusted.

Figure 9:
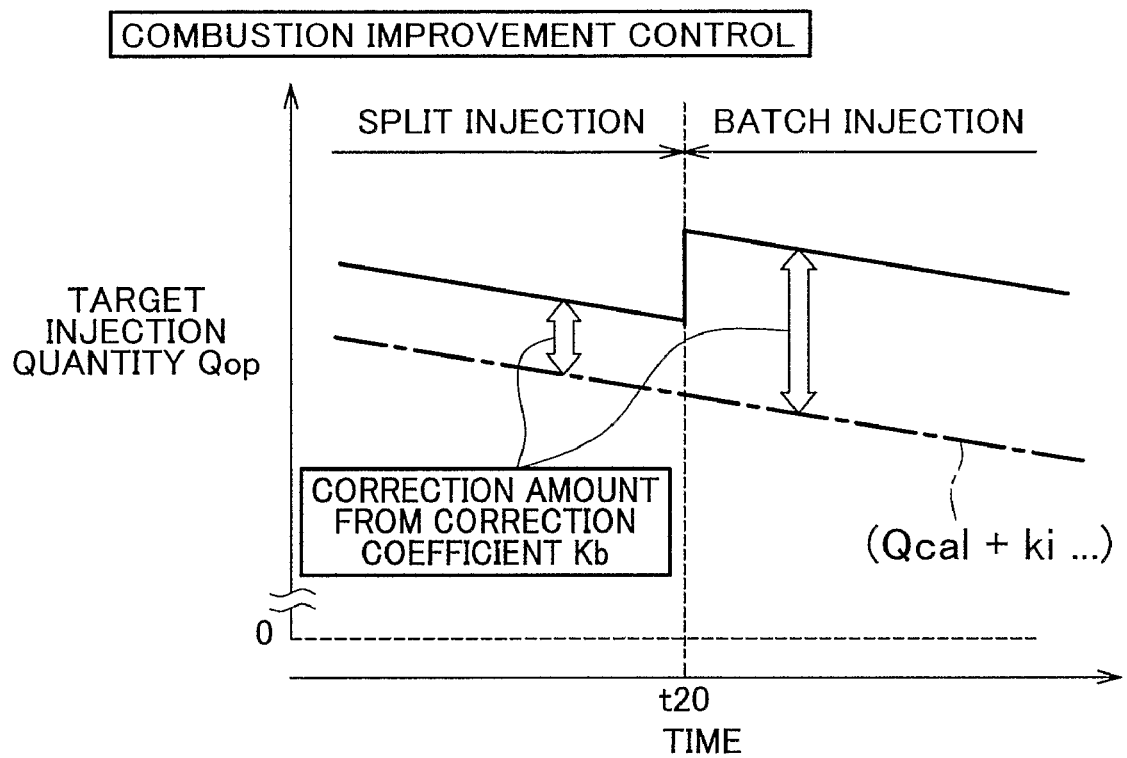
FIG. 9 is a timing chart illustrating one example of a manner in which a target injection amount is calculated in control to improve combustion.

In this exemplary embodiment, the fuel injection mode in combustion improvement control described above corresponds to a second injection mode in which the fuel increase amount is set larger for a batch injection than it is for a split injection. FIG. 9 shows one example of a manner in which the target injection quantity Qop is calculated when the injection mode is switched between split injection and batch injection while combustion improvement control is being executed.

As shown in FIG. 9, the correction coefficient Kb when a split injection is selected (i.e., before time t20) is calculated to be a value which is smaller than the correction coefficient Kb when a batch injection is selected. Accordingly, the correction coefficient Kb when either the batch injection or the split injection is selected, and thus the target injection quantity Qop, can be calculated in view of the tendency described above for the amount of fuel that does not contribute to combustion to be larger with a batch injection than with a split injection when fuel is injected during the intake stroke. Therefore, even if the injected fuel does not vaporize as readily when a batch injection is selected, such that the amount of fuel which does not contribute to combustion increases, a substantive insufficiency in the fuel injection quantity due to that increase, and thus deterioration of the combustion state due to that insufficiency, is able to be inhibited. As a result, it is possible to improve the combustion state while maintaining stable operation of the internal combustion engine 10 when both a split injection and a batch injection (after time t20) are selected.

As described above, the following effects can be obtained with this exemplary embodiment.

(1) In an increase correction of the fuel injection amount in catalyst rapid warm-up control, the increase correction amount Kc is calculated as a larger value for a split injection than it is for a batch injection. Therefore, even if the amount of fuel that adheres to the inside wall of the combustion chamber 12 increases when a split injection is performed, a substantive insufficiency in the fuel injection quantity due to that increase, and thus deterioration of the combustion state due to that insufficiency, is able to be inhibited.

(2) The increase correction amount Kc is calculated based on the coolant temperature THW and the time Ts elapsed after start-up. Therefore, the increase correction amount Kc can be calculated in view of the fact that amount of fuel that adheres changes depending on the engine temperature and the time Ts elapsed after start-up, which makes it possible to ensure the amount of fuel that actually contributes to combustion and thus further improve the stability of the combustion state.

(3) With a split injection during catalyst rapid warm-up control, the injection quantity split rate Rt is calculated to be closer to 0.5 the higher the coolant temperature THW. Therefore, when the total quantity of fuel to be injected from both injections is relatively small, the fuel injection quantity of one injection or the other may be too small depending on the settings of the injection quantity split rates. The injection quantity split rate Rt is therefore set so that the difference between the injection quantity split rates of the injections is relatively small. Accordingly it is possible to suppress, to the greatest extent possible, the fuel injection quantity of each injection from becoming too small, and thus possible to ensure proper fuel injection operation in each injection.

(4) When the coolant temperature THW is equal to, or greater than, the predetermined temperature THb, the injection quantity split rate Rt is calculated to be 0.5. Therefore, when the total quantity of fuel to be injected over the injections is small and the total fuel injection quantity is split unequally, a situation may occur in which the fuel injection quantity of one injection or the other falls below the minimum fuel injection quantity of the fuel injection valve 16 such that proper injection is no longer possible. Therefore, the injection quantity split rate Rt is set so that the injection quantity split rates of the injections are equal. As a result, the foregoing situation can be avoided to the greatest extent possible so split injections can be executed more often.

(5) When the coolant temperature THW is equal to, or less than, the predetermined temperature THa, the injection quantity split rate Rt is calculated to be a predetermined value. As a result, stratified-charge combustion is able to be performed stably.

(6) When the fuel injection quantity is increase-corrected during combustion improvement control, the correction coefficient Kb is calculated to be a larger value for a batch injection than it is for a split injection. Therefore, even if the injected fuel does not vaporize as readily when a batch injection is performed, such that the amount of fuel which does not contribute to combustion increases, a substantive insufficiency in the fuel injection quantity due to that increase, and thus deterioration of the combustion state due to that insufficiency, is able to be inhibited.

(7) The correction coefficient Kb is calculated based on the coolant temperature THW. Therefore, the correction coefficient Kb can be calculated in view of the degree to which vaporization of the injected fuel is promoted, which changes depending on the engine temperature. Accordingly, it becomes possible to ensure the amount of fuel that actually contributes to combustion and thus further stabilize the combustion state.

(8) When the fuel injection quantity is increase-corrected while the engine is cold, the fuel increase is set to be greater for a split injection than it is for a batch injection when catalyst rapid warm-up control is being executed. Then when combustion improvement control is being executed, the fuel increase is set to be greater for a batch injection than it is for a split injection. Accordingly, it is possible to set the fuel increase in view of changes in the extent to which fuel vaporization is promoted and the extent to which fuel adheres to the cylinder wall after engine start-up, as described above. Accordingly, it is possible to ensure fuel which contributes to combustion and therefore stabilize engine combustion.

The foregoing exemplary embodiment may be modified as follows.

Other than the coolant temperature THW, any value that has a high correlation to the total fuel quantity injected over the injections of a split injection, such as the engine speed NE, the intake air amount GA, or the time Ts elapsed after start-up, can be used as a calculation parameter of the injection quantity split rate Rt. In other words, those parameters can be used as indication values for the total fuel quantity, and the injection quantity split rates for the injections can be set based on the total fuel quantity.

More specifically, the injection quantity split rates of the injections may be set as in the following three configurations. Configuration 1: The injection quantity split rates of the injections are set so that the difference between them is less the smaller the total fuel quantity. Configuration 2: The injection quantity split rates of the injections are set so that they are equal when the total fuel quantity is equal to, or less than, a predetermined quantity. Configuration 3: The injection quantity split rates of the injections are set so that the fuel injection quantity of the injection at the end of the compression stroke is greater than the fuel injection quantity of any other injection when the total fuel quantity is equal to, or greater than, a predetermined quantity.

For a split injection during combustion improvement control, the injection quantity split rates of the injections may be set variably based on the total quantity of fuel to be injected over the injections. Even with this configuration, effects similar to those described in sections (3)

and (4) above can be obtained by setting the injection quantity split rates of the injections as they are in configurations 1 and 2 above.

In the foregoing exemplary embodiment, the increase correction amount Kc and the correction coefficient Kb are calculated based on the coolant temperature THW as the indication value of the engine temperature. Instead of the coolant temperature THW, however, another value indicative of the engine temperature may be used, such as the temperature of engine lubricating oil, for example. Also, a temperature sensor may be provided in the internal combustion engine 10 and the engine temperature detected by that temperature sensor may be used, for example.

The first fuel injection timing in a split injection during catalyst rapid warm-up control can be changed as appropriate, e.g., in the middle of the compression stroke or at the end of the intake stroke.

The second fuel injection timing in a split injection during combustion improvement control may also be set to be at the beginning of the compression stroke.

This invention can also be applied to an apparatus which injects fuel in a series of separate injections at three or more different timings.

The invention can also be applied to a fuel injection control apparatus of an internal combustion engine in which only one of the catalyst rapid warm-up control and the combustion improvement control is executed. In an apparatus in which only combustion improvement control is executed, the fuel increase amount may also be calculated based on the time elapsed after start-up. With this structure, the fuel increase amount can be set in view of the tendency of the temperature of the engine combustion chamber to increase, and therefore vaporization of the injected fuel to be promoted, the more time that elapses after engine start-up. Accordingly, it is possible to ensure the amount of fuel that actually contributes to combustion, and thus further stabilize the combustion state.

The invention can also be applied to an apparatus which executes so-called post start-up increase correction control, or control to increase-correct the fuel injection quantity over a predetermined period of time (such as several tens of seconds) immediately after start-up is complete in order to compensate for insufficient fuel vaporization immediately after a cold start of the internal combustion engine.

While the invention has been described with reference to exemplary embodiments thereof, it is to be understood that the invention is not limited to the exemplary embodiments or constructions. To the contrary, the invention is intended to cover various modifications and equivalent arrangements other than described above. In addition, while the various elements of the exemplary embodiments are shown in various combinations and configurations, which are exemplary, other combinations and configurations, including more, less or only a single element, are also within the spirit and scope of the invention.

The invention claimed is:

1. A fuel injection control apparatus for a direct injection internal combustion engine including an ignition device for igniting an air/fuel mixture, which, when the engine is cold, switches a fuel injection mode between a batch injection in which fuel is injected once at the end of a compression stroke and a split injection in which fuel is injected at a plurality of timings including at least at the end of the compression stroke, the fuel injection control apparatus comprising increase correcting means for setting a fuel increase amount larger for the split injection than for the batch injection when increase-correcting a fuel injection quantity set based on an engine operating state.

2. The fuel injection control apparatus for a direct injection internal combustion engine according to claim 1, wherein the increase correcting means sets the fuel increase amount based on at least one of an engine temperature and a time elapsed after engine start-up.

3. The fuel injection control apparatus for a direct injection internal combustion engine according to claim 1, further comprising split rate setting means for setting an injection quantity split rate of each injection when the fuel injection mode is set to the split injection, wherein the split rate setting means sets the injection quantity split rate of each injection such that the difference between the injection quantity split rates becomes less the smaller the total quantity of fuel injected by all of the injections of the split injection.

4. The fuel injection control apparatus for a direct injection internal combustion engine according to claim 3, wherein the split rate setting means sets the injection quantity split rate of each injection such that the injection quantity split rates become equal when the total quantity of fuel injected by all of the injections of the split injection is equal to, or less than, a predetermined quantity.

5. The fuel injection control apparatus for a direct injection internal combustion engine according to claim 3, wherein the split rate setting means sets the injection quantity split rate of each injection such that the fuel injection quantity of the injection at the end of the compression stroke is larger than the fuel injection quantity of any other injection when the total quantity of fuel injected by all of the injections of the split injection is greater than a predetermined value.

6. The fuel injection control apparatus for a direct injection internal combustion engine according to claim 1, wherein the increase correction of the fuel injection quantity is performed when the engine is idling until a predetermined period of time has elapsed after engine start-up.

7. A fuel injection control apparatus for a direct injection internal combustion engine, which, when the engine is cold, switches a fuel injection mode between a batch injection in which fuel is injected once during an intake stroke and a split injection in which fuel is injected a plurality of times during the intake stroke, the fuel injection control apparatus comprising increase correcting means for setting a fuel increase amount larger for the batch injection than for the split injection when increase-correcting a fuel injection quantity set based on an engine operating state.

8. The fuel injection control apparatus for a direct injection internal combustion engine according to claim 7, wherein the increase correcting means sets the fuel increase amount based on at least one of an engine temperature and a time elapsed after engine start-up.

9. The fuel injection control apparatus for a direct injection internal combustion engine according to claim 7, wherein the increase correction of the fuel injection quantity is performed when the engine is idling until a predetermined period of time has elapsed after engine start-up.

10. A fuel injection control apparatus for a direct injection internal combustion engine, which, after start-up when the engine is cold, switches a fuel injection mode between a batch injection in which fuel is injected once and a split injection in which fuel is injected a plurality of times, wherein when increase-correcting a fuel injection quantity set based on an engine operating state, from after engine start-up until a predetermined period of time has passed, the fuel injection mode is set to a first injection mode in which the fuel increase amount for the split injection is set larger than the fuel increase amount for the batch injection, and then the fuel injection mode is set to a second injection mode in which the fuel increase amount for the batch injection is set larger than the fuel increase amount for the split injection.

11. The fuel injection control apparatus for a direct injection internal combustion engine according to claim 10, wherein in the first injection mode, fuel is injected once in the batch injection while fuel is injected at a plurality of timings, including at least at the end of a compression stroke, in the split injection, and in the second injection mode, fuel is injected once during an intake stroke in the batch injection while fuel is injected a plurality of times during the intake stroke in the split injection.

12. The fuel injection control apparatus for a direct injection internal combustion engine according to claim 10, wherein the fuel increase amount is set based on at least one of an engine temperature and a time elapsed after engine start-up.

13. The fuel injection control apparatus for a direct injection internal combustion engine according to claim 10, further comprising split rate setting means for setting an injection quantity split rate of each injection when the fuel injection mode is set to the split injection, wherein the split rate setting means sets the injection quantity split rate of each injection such that the difference between the injection quantity split rates becomes less the smaller the total quantity of fuel injected by all of the injections of the split injection.

14. The fuel injection control apparatus for a direct injection internal combustion engine according to claim 13, wherein the split rate setting means sets the injection quantity split rate of each injection such that the injection quantity split rates become equal when the total quantity of fuel injected by all of the injections of the split injection is equal to, or less than, a predetermined quantity.

15. The fuel injection control apparatus for a direct injection internal combustion engine according to claim 10, wherein the increase correction of the fuel injection quantity is performed when the engine is idling until a predetermined period of time has elapsed after engine start-up.

16. A fuel injection control method for a direct injection internal combustion engine including an ignition device for igniting an air/fuel mixture, which, when the engine is cold, switches a fuel injection mode between a batch injection in which fuel is injected once at the end of a compression stroke and a split injection in which fuel is injected at a plurality of timings including at least at the end of the compression stroke, the fuel injection control method comprising:
  setting a fuel increase amount larger for the split injection than for the batch injection when increase-correcting a fuel injection quantity set based on an engine operating state.

17. A fuel injection control method for a direct injection internal combustion engine, which, when the engine is cold, switches a fuel injection mode between a batch injection in which fuel is injected once during an intake stroke and a split injection in which fuel is injected a plurality of times during the intake stroke, the fuel injection control method comprising:
  setting a fuel increase amount larger for the batch injection than for the split injection when increase-correcting a fuel injection quantity set based on an engine operating state.

18. A fuel injection control method for a direct injection internal combustion engine, which, after start-up when the engine is cold, switches a fuel injection mode between a batch injection in which fuel is injected once and a split injection in which fuel is injected a plurality of times, the fuel injection control method comprising:
  when increase-correcting a fuel injection quantity set based on an engine operating state, from after engine start-up until a predetermined period of time has passed, setting the fuel injection mode to a first injection mode in which the fuel increase amount for the split injection is set larger than the fuel increase amount for the batch injection, and then setting the fuel injection mode to a second injection mode in which the fuel increase amount for the batch injection is set larger than the fuel increase amount for the split injection.

* * * * *